Sept. 27, 1966  E. A. CARSEY  3,274,892
DUST CONTROL APPARATUS FOR METAL WORKING MACHINES
Filed March 30, 1965 2 Sheets-Sheet 1
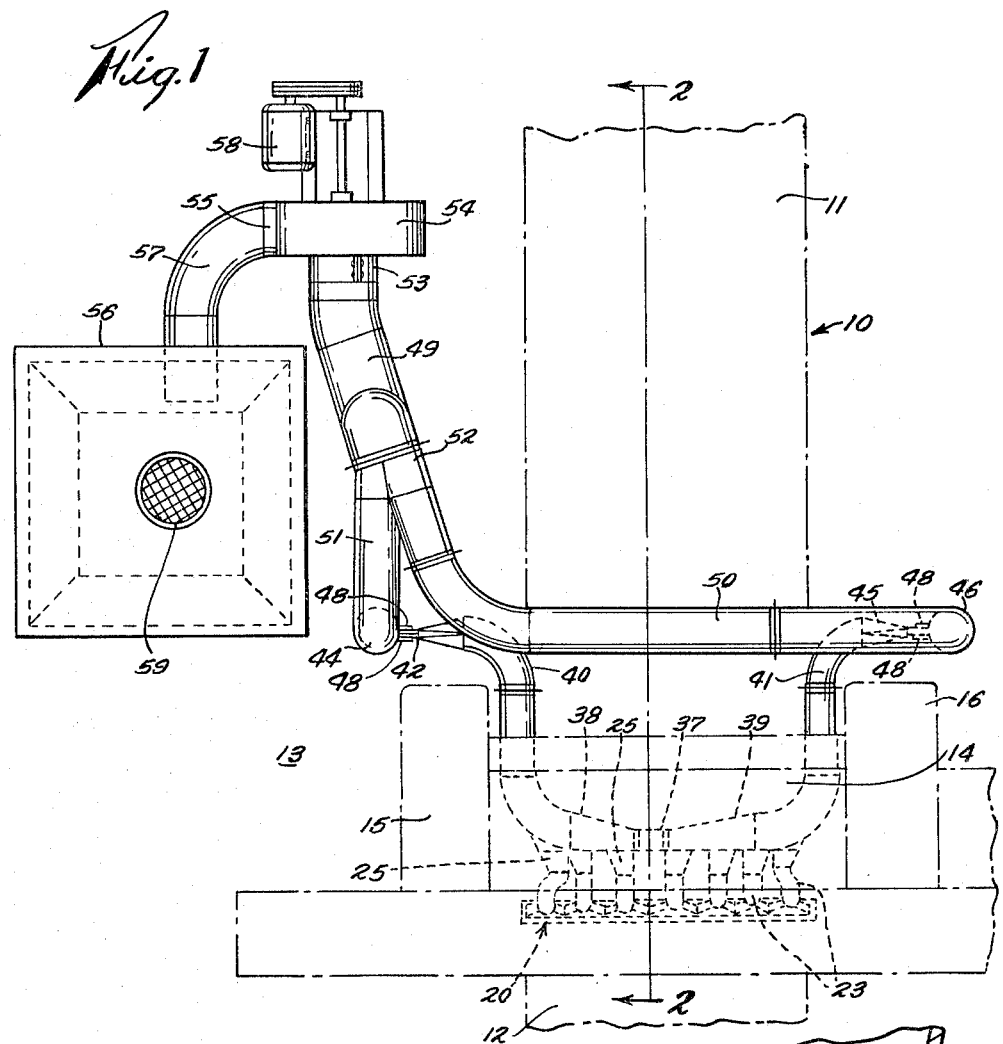
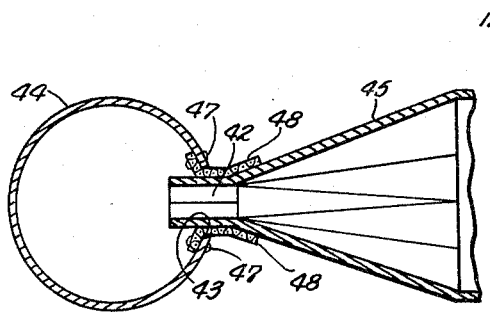
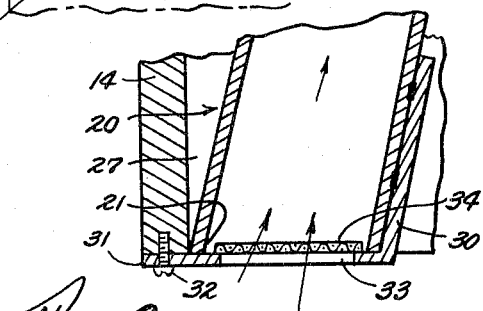
INVENTOR
Eugene A. Carsey

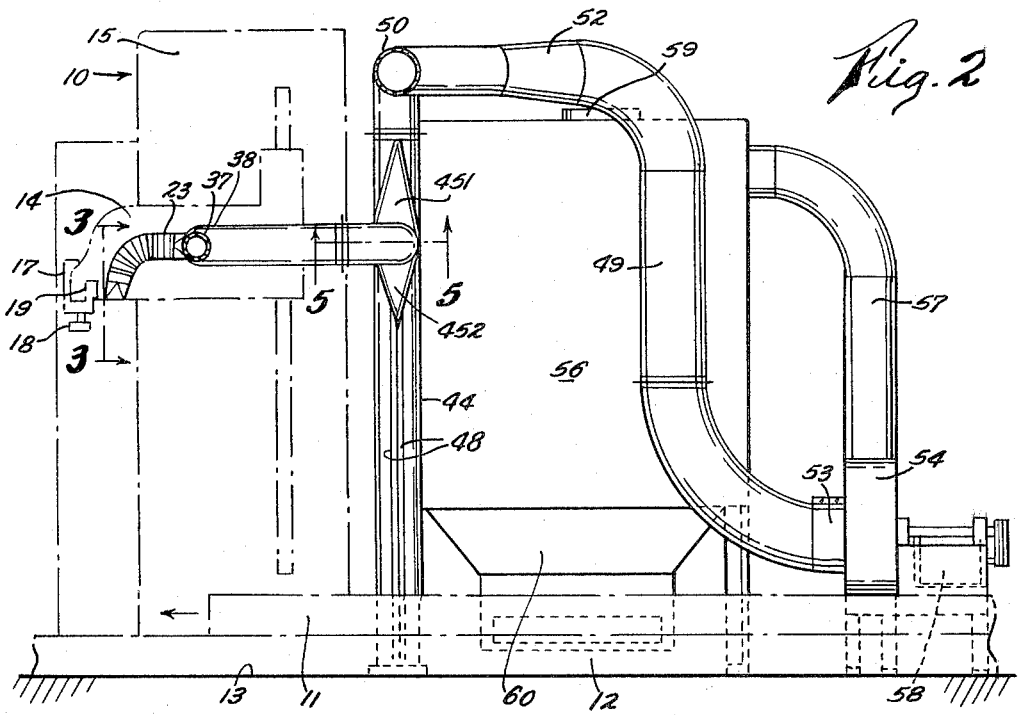
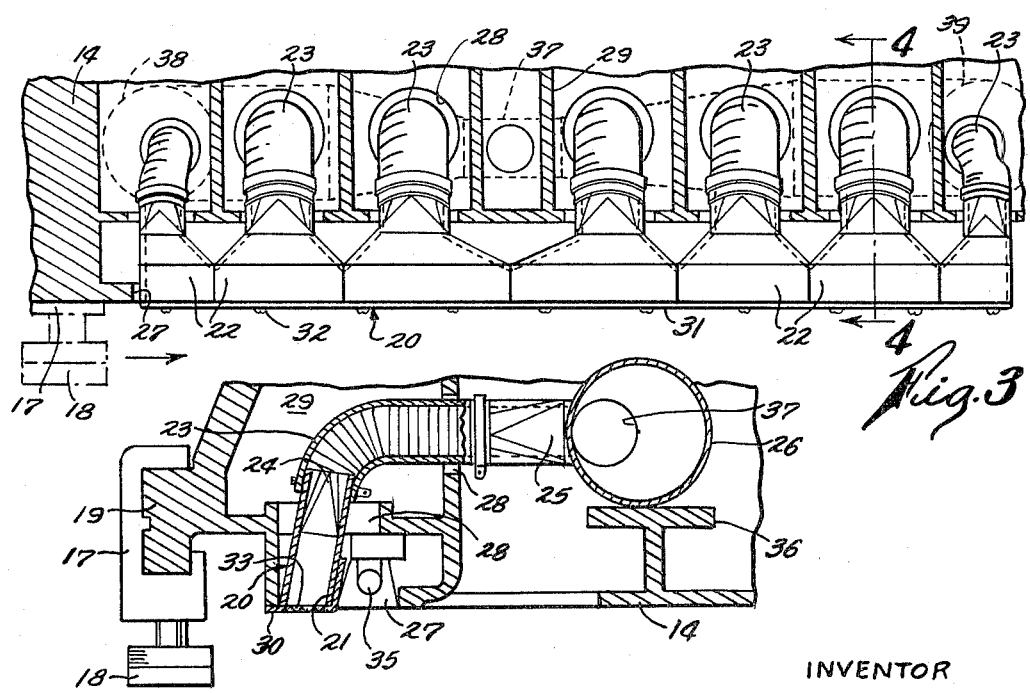

United States Patent Office 3,274,892
Patented Sept. 27, 1966

3,274,892
DUST CONTROL APPARATUS FOR METAL
WORKING MACHINES
Eugene A. Carsey, Cincinnati, Ohio, assignor to The Kirk
& Blum Manufacturing Co., Cincinnati, Ohio, a corporation of Ohio
Filed Mar. 30, 1965, Ser. No. 443,908
4 Claims. (Cl. 90—24)

This invention relates to machine mounted apparatus for intercepting and entraining at its source dust and heavier metallic particulate created by the operation of metal working tools and which carries off said entrained contaminents to a convenient collection station.

My invention is particularly adapted to planers used to form flat surfaces on large metal work pieces, such as castings, and the like, and it is in association with this type of machine that I have illustrated and described my dust control apparatus in the following specification.

An object of this invention is to provide a dust control apparatus having an elongated, intake hood mounted on a movable part of the metal working machine and positioned alongside of the path of the metal removing tool to entrain all dust and a substantial portion of the metal particles created by operation of the tool on the work.

Another object of the invention is to provide an improved and efficient dust and metal particulate entraining apparatus that is incorporated into a movable tool carrying part of a metal working machine in a novel manner such that it will efficiently entrain dust and metal particles created by a moving tool while its presence will in no way interfere with the proper operation of the machine.

A further object of the invention is to provide a simplified, rugged and completely protected dust and metal particulate control apparatus for metal working machines.

Other objects and advantages will become apparent as the description proceeds and reference is had to the accompanying drawings, wherein:

FIG. 1 is a plan view of my dust collecting apparatus, the outline of a metal working machine, such as a metal planer, being shown therein in dot-and-dash lines.

FIG. 2 is a section taken on line 2—2 of FIG. 1.

FIG. 3 is an enlarged section taken on line 3—3 of FIG. 2.

FIG. 4 is a section taken on line 4—4 of FIG. 3.

FIG. 5 is an enlarged section taken on line 5—5 of FIG. 2.

FIG. 6 is an enlarged fragmental detail in section showing the intake nozzle structure of my apparatus.

In the drawings, my invention is depicted in association with a planer for large metal work pieces, the planer being shown in dot-and-dash lines 10 in FIGS. 1 and 2 and comprising generally a longitudinally movable table 11 on which a work piece (not shown) is fastened, said table being mounted on and guided by a bed 12 fixed on a factory floor 13. A fabricated cross slide 14 is mounted above the bed on opposed machine standards 15 and 16, conventional mechanism (not shown) being provided for moving the cross slide vertically for adjustment to the level of the work piece carried by the table 11. A slide rest 17 carrying a suitable planing tool 18 is reciprocated along a lateral track 19 on the cross slide 14. The work piece carrying table 11 is intermittently advanced on the bed 12 relative to the properly adjusted cross slide 14 and the slide rest 17 traverses the cross slide 14 bringing the planing tool 18 against the work which successively shaves off side-by-side narrow thin strips of metal until a perfectly flat surface is produced on the work piece. In the process the traversing planing tool creates considerable dust and planes off metal particles which, respectively, contaminate the air in the factory and build up objectionable metal scraps around the machine. This dust and a considerable portion of the metal particles are intercepted at their source adjacent the operating tool and there entrained and carried away to a collection station by my dust control apparatus.

As best shown in FIGS. 3 and 4 the dust control apparatus comprises an elongated, composite hood 20 having a lateral opening 21 disposed alongside the path of the traversing planing tool 18 and coextensive with that path. The hood 20 has a plurality of interconnected intake nozzle members 22 joined together at adjacent ends to form the single, lateral opening 21 in the hood; each nozzle having a flexible pipe 23 connected to its reduced upper outlet end 24. Each pipe 23 is connected to a reduced intake fitting 25 on a lateral cross-over pipe 26. The hood and the nozzles are located within a downwardly facing opening 27 in the fabricated cross slide 14, the individual flexible pipes being led through longitudinally aligned holes 28—28 in the slide body and between upstanding, strengthening ribs 29 of the slide body.

The hood is positioned within the cross slide opening by means of an L-shaped cover plate 30 spot welded to the side of the hood and having its projecting lateral edge 31 fastened to the slide by row of screws 32. As shown in FIG. 6 the cover plate has an elongated, laterally extending slot 33 therein which is guarded by a screen 34 to admit all dust and metal particles up to a predetermined size into the hood. The usual fluorescent lamp 35 is positioned within the slide opening 27 alongside the hood 20.

The cross over pipe 26 may rest upon and be banded to a lateral ledge 36 on the slide 14 and has a central reduced section 37 and larger end sections 38 and 39 which have confronting tapered portions connecting them to the central section. As best shown in FIGS. 1 and 2 the end sections 38 and 39 of the cross over pipe 26 are connected to reverse elbow pipes 40 and 41, respectively, the pipe 40 terminating in an elongated and flattened nozzle member 42 which extends through a vertical slot 43 (FIG. 5), formed in a collector stand pipe 44 mounted on end upon the factory floor 13 on one side of the planer. The pipe 41 is connected to a similar nozzle member 45 which projects through a similar slot formed in a collector stand pipe 46 mounted on its end upon the floor 13 on the opposite side of the planer from the stand pipe 44.

As best shown in FIG. 5 the vertical slot in each collector stand pipe 44 and 46 forms opposed side edges 47—47 and fixed to each side edge is an elongated flap 48—48 made of flexible material. The flaps are normally adapted to be flexed toward one another into face-to-face abutment. Each nozzle member has a plow portion 451 and 452 (FIG. 2) on its upper and lower ends, respectively, to secure an air-tight, sliding connection between the collector stand pipe and the nozzle whilst permitting vertical adjusting movements of the slide 14 relative to the work piece carried upon the table 11 of the machine. The upper end of the collector stand pipe 46 is connected to a main duct 49 by means of a lateral pipe 50 whilst the collector stand pipe 44 is connected at its upper end to said main duct by a pipe 51, said pipes 50 and 51 joining the main duct by a fitting 52. As best shown in FIGS. 1 and 2 the main duct is connected with the intake 53 of an exhaust fan 54, the delivery end 55 of the fan being connected to a suitable filter unit 56 through a pipe 57. The fan is driven by a suitable motor 58. The cleaned air is forced through a screened opening 59 in the top of the filter while dust and metal particles are collected in a hopper 60 beneath the filter, said hopper having closure means for carrying off of the collected particulate.

The operation of my improved apparatus will now be described in reference to its preferred association with a metal planer. A work piece is mounted in the usual manner upon the bed 11 and elevating mechanism for the cross slide 14 is then operated to move the slide into exact vertical position for operation of the planing tool 18 upon said work, it being noted that during said vertical movement of the cross slide all the dust collector apparatus mounted on the slide will move therewith, the nozzles 42 and 48 moving freely in their respective slotted collector stand pipes 44 and 46 without breaking the flexible seal between the slots and the nozzles. The exhaust fan 54 is next made operative and thereafter the planer table and tool feeding devices take over to perform a planing operation on the work, it being understood that the traversing planer tool 18 will create considerable dust and shave off metal particulate which are entrained continuously at their sources by the velocity of air entering the mouth of the hood 20 which is alongside of and closely adjacent the entire lateral path of the tool. The entrained dust and metal particulate will be carried partly through each collector stand pipe and their associated nozzles and from thence by conduit pipes to the main duct 49 and into the exhaust fan and from the fan to the pipe 55 and the filter 56.

Having thus described my invention what I claim as new is:

1. Dust collecting apparatus for a metal working machine having a vertically reciprocated cross slide and a traversing tool rest on the cross slide comprising a composite, laterally extending hood mounted on the cross slide alongside the path of the tool slide rest, said hood having a number of side-by-side intake nozzles interconnected at their intake ends, each nozzle having a reduced discharge end, a cross over pipe positioned on the cross slide, said cross over pipe having a lateral row of spaced apart fittings, a pipe connecting the reduced discharge end of each nozzle to a fitting, the intake ends of the nozzles extending laterally the width of the hood and disposed closely adjacent the tool path, a collector stand pipe positioned beside the machine, a conduit connected to the cross over pipe and having a vertically sliding connection with the stand pipe, a filter means, and fan means continuously exhausting the stand pipe into the filter means.

2. Dust collecting apparatus for a metal working machine having a vertically reciprocated cross slide and a traversing tool rest on the cross slide comprising a composite, laterally extending hood mounted on the cross slide alongside the path of the tool slide rest, said hood having a number of side-by-side intake nozzles interconnected at their intake ends, each nozzle having a reduced discharge end, a cross over pipe positioned on the cross slide, said cross pipe having a lateral row of spaced apart fittings, a pipe connecting the reduced discharge end of each nozzle to a fitting, the intake ends of the nozzles extending laterally the width of the hood and disposed closely adjacent the tool path, a collector stand pipe positioned on each side of the machine, a conduit connected to each end of the cross over pipe and each having a sliding connection with the adjacent collector stand pipe, a filter means, and fan means continuously exhausting the stand pipe into the filter means.

3. Dust collecting apparatus set forth in claim 2 characterized by the fact that the cross over pipe has a centrally reduced section and larger end sections.

4. Dust collecting apparatus as set forth in claim 2 characterized by the fact that the fan means continuously exhausting the stand pipe into the filter means comprises an exhaust fan communicating with a filter and a lateral pipe means connecting the upper ends of the stand pipes together and connected with the intake of the fan.

References Cited by the Examiner
UNITED STATES PATENTS 2,224,236  12/1940  Shoemaker.
3,167,260  1/1965  Gibbons et al.

WILLIAM W. DYER, JR., *Primary Examiner.*

ANDREW R. JUHASZ, *Examiner.*

G. A. DOST, *Assistant Examiner.*